(12) United States Patent
Spiller (10) Patent No.: US 6,449,815 B1
(45) Date of Patent: Sep. 17, 2002

(54) ADJUSTABLE STRAP ASSEMBLY

(76) Inventor: Karmicheal Spiller, 3730 Hancock St., Jackson, MS (US) 39213

( * ) Notice: Subject to any disclaimer, the term of this patent is extended or adjusted under 35 U.S.C. 154(b) by 0 days.

(21) Appl. No.: 09/758,340

(22) Filed: Jan. 12, 2001

(51) Int. Cl.$^7$ .............................. A45F 4/02; A01K 27/00
(52) U.S. Cl. .......................... 24/306; 119/792; 119/907
(58) Field of Search .................. 24/306, 422, 307–310, 24/318, 164, 197; 224/153; 119/907, 792

(56) References Cited

U.S. PATENT DOCUMENTS

| | | | | |
|---|---|---|---|---|
| 4,273,130 A | * | 6/1981 | Simpson | 24/306 X |
| 4,566,255 A | * | 1/1986 | DeGroot | 119/792 X |
| 4,697,849 A | * | 10/1987 | Smith | 24/306 X |
| 4,774,801 A | * | 10/1988 | Johansen et al. | 119/792 X |
| 5,215,333 A | * | 6/1993 | Knight | 24/306 X |
| 5,582,337 A | * | 12/1996 | McPherson et al. | 224/660 |
| 5,604,961 A | * | 2/1997 | Cole | 24/306 |
| 5,896,831 A | * | 4/1999 | Alpert | 119/856 |
| 5,920,965 A | * | 7/1999 | Kleban | 24/265 R |

* cited by examiner

Primary Examiner—Robert J. Sandy
(74) Attorney, Agent, or Firm—Peter A. Borsari (57) ABSTRACT

An adjustable strap assembly utilizing hook and loop type fastening means as the primary adjustment means is provided which can be used on a variety of articles which require some measure of adjustment to accommodate different users or different utilizations. The adjustable strap assembly includes an elongated web having an outersurface provided with loop-type fastening means and a securing strap member having an undersurface provided with hook type fastening means. The securing strap member is attached to a first end of the elongated web subsequent to the formation of a first looped end and is releasably secured to the elongated web by the contact and engagement of the hook-type with the loop type fastening means. Release of the hook-type fastening means from the loop-type fastening means is facilitated with a key which slides between the hook-type and loop-type fastening means. The adjustable strap assembly may be used alone as an adjustable strap, or may be modified for use as an animal collar or animal collar and harness assembly.

14 Claims, 6 Drawing Sheets

ADJUSTABLE STRAP ASSEMBLY

FIELD OF INVENTION

The present invention relates to an adjustable strap assembly utilizing hook and loop type fastening means as the primary adjustment means. More particularly, the present invention relates to an adjustable strap assembly that can be used on a variety of articles which require some measure of adjustment to accommodate different users or different utilizations. The adjustable strap assembly may be used alone as an adjustable strap, or may be modified for use as an animal collar or animal collar and harness assembly.

BACKGROUND OF THE INVENTION

Straps, belts, collars, harnesses and similar fastening articles which provide some means of adjustability are well known in the art. Such devices utilize one or more adjustment means. The most simple such device may be the waist belt, which uses a buckle frame and tongue that engages one of a series of holes. Another simple device is the three post sliding buckle. Through the years, more complex designs have been developed having from one to several type of adjustment means, including a plurality of loops, buckling devices, ring elements, snap fit arrangements and hook and loop type fastening means. For example, U.S. Pat. No. 4,498,613 to Donahue et al., issued Feb. 12, 1985, provides an adjustable support device using Velcrou fasteners. U.S. Pat. No. 5,600,854 to Henrekin, issued Feb. 11, 1997 and U.S. Pat. No. 5,915,535 to Henrekin-Jordan, issued Jun. 29, 1999, show an adjustable strap fastener using a pair of loops and Velcro™ fastening means.

A number of devices have been produced specifically relating to animal collars and animal collar and harness assemblies which include adjustment means to accommodate different sizes of animals. Such collars and harnesses have been used on domestic animals for the purposes of restraining and controlling animals. Prior art collars and harnesses have embodied a variety of designs, ranging from simple neck collars and harnesses to more elaborate configurations having a plurality of loops, buckles and fitted vest like straps. While the more elaborate designs have overcome some of the drawbacks of the simpler designs, they also have presented new drawbacks relating specifically to adjustability and/or ease of use. Most significantly, many of these designs frequently are difficult to adjust. The designs having simplified adjustments typically lack the ability to be adjusted properly to fit animals of different shapes and sizes. Typical animal harnesses are represented by U.S. Pat. No. 4,444,152, issued Apr. 24, 1984 to Berardo; U.S. Pat. No. 4,655,172, issued Apr. 7, 1987 to King; U.S. Pat. No. 4,559,906, issued Dec. 24, 1985 to Smith; U.S. Pat. No. 5,511,515, issued Apr. 30, 1996 to Brown et al.; and U.S. Pat. No. 5,937,795, issued Aug. 17, 1999 to Raphael. However, each of these devices has complicated adjustment means which may not be suitable for all users.

A number of people have limited physical abilities, due to arthritis and similar debilitating diseases, limited vision, the use of prosthetic hands and the like, and have difficulty in using many of the adjustable fastening articles currently available. Hence, a need still exists in the art to provide an adjustable strap assembly which is simple and quick and easy to use. Such an adjustable strap assembly should be sufficiently versatile that it can utilized on a variety of articles, including for example, cloth bags such as gym bags, tote bags, duffel bags and military bags, back packs, clothing articles such as overalls, suspenders, bras, waist belts, watch bands, head bands, baseball caps, industrial and domestic apron straps, safety helmets, head-light bands for hunters, luggage straps and shoulder straps for purses. In addition, such an adjustable strap assembly should be adaptable by simple modification for use as animal collars, animal leashes, animal collar and harness assemblies, children's harnesses, safety harnesses, parachute harnesses, horse bridles, horse and saddle belly straps and horse reign straps to name but a few. Further, such an adjustable strap assembly should be capable of utilizing a variety of strapping materials, including for example, leather, flexible plastic, nylon, vinyl, elastic, cloth and rope style strapping materials, which may be provided with reflective, glow-in-the-dark and/or printed design features.

SUMMARY OF THE INVENTION

Accordingly, it is an object of the present invention to provide an adjustable strap assembly which is simple and easy to use.

It is another object of the present invention to provide an adjustable strap assembly which can be used by people having limited physical abilities.

It is an additional object of the present invention to provide an adjustable strap assembly which is sufficiently versatile that it can utilized on a variety of articles.

It is also an object of the present invention to provide an adjustable strap assembly which can be manufactured from a variety of strapping materials, including leather, flexible plastic, nylon, vinyl, elastic, cloth and rope style strapping materials, which may be provided with reflective, glow-in-the-dark and/or printed design features.

It is a further object of the present invention to provide an adjustable strap assembly which can be adapted for use as an animal collar or leash with a simple modification.

It is yet another object of the present invention to provide an adjustable strap assembly which can be adapted for use as a harness with simple modifications.

It is still another object of the present invention to provide an adjustable strap assembly which is inexpensive to manufacture.

Additional objects, advantages and novel features of the invention will be set forth in part of the description which follows, and in part will become apparent to those skilled in the art upon examination of the following specification or may be learned by practice of the invention.

These and other objects of the present invention are achieved by providing an adjustable strap assembly comprising an elongated web having an outersurface of loop-type fastening means, a separate short strap member having an undersurface of hook-type fastening means which is secured to one end of the elongated web, and preferably a key which facilitates release of the hook-type fastening means from the loop type fastening means.

BRIEF DESCRIPTION OF THE DRAWINGS

The present invention will be better understood with reference to the appended drawing sheets, wherein.

DETAILED DESCRIPTION

Figure 1:
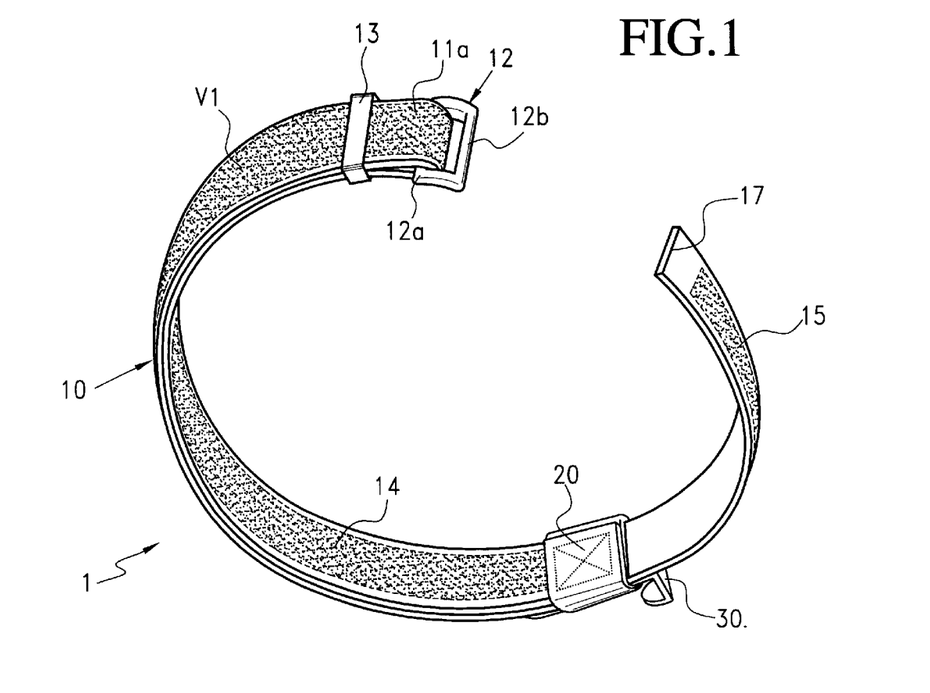
FIG. 1 is a front perspective view of the adjustable strap assembly of the present invention.
Figure 1A:
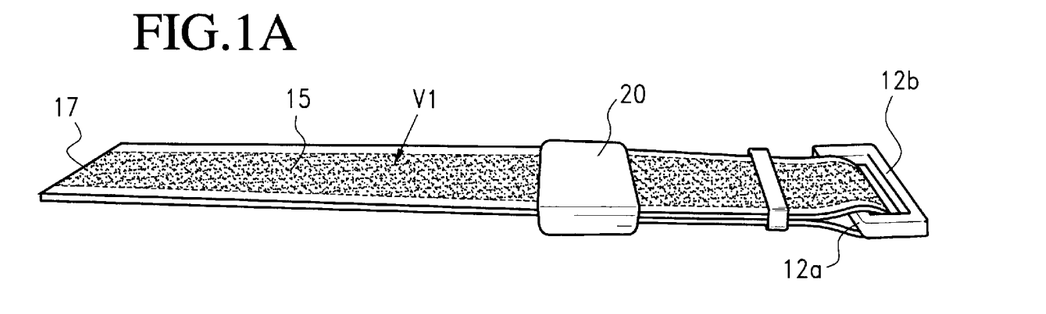
FIG. 1A is a top perspective view of the adjustable strap assembly of the present invention.
Figure 1B:
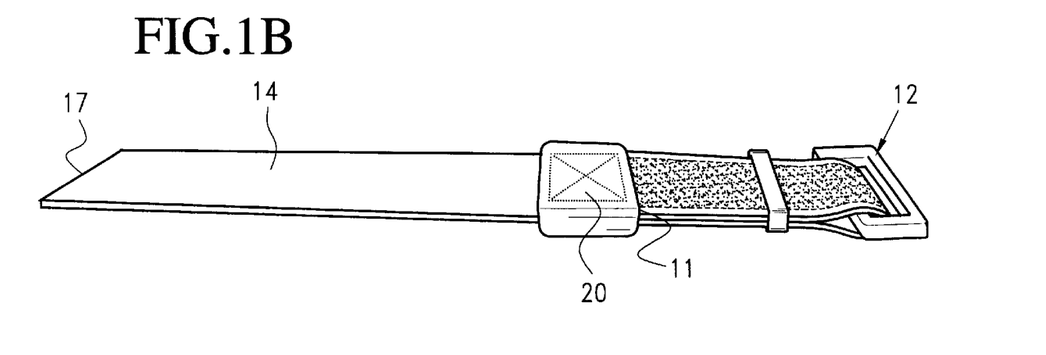
FIG. 1B is a bottom perspective view of the adjustable strap assembly of the present invention.
Figure 1C:
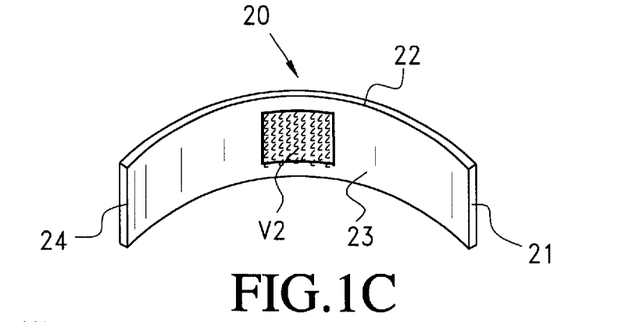
FIG. 1C is a bottom perspective view of the short strap member of the adjustable strap assembly of the present invention.
Figures 1D, 1E:
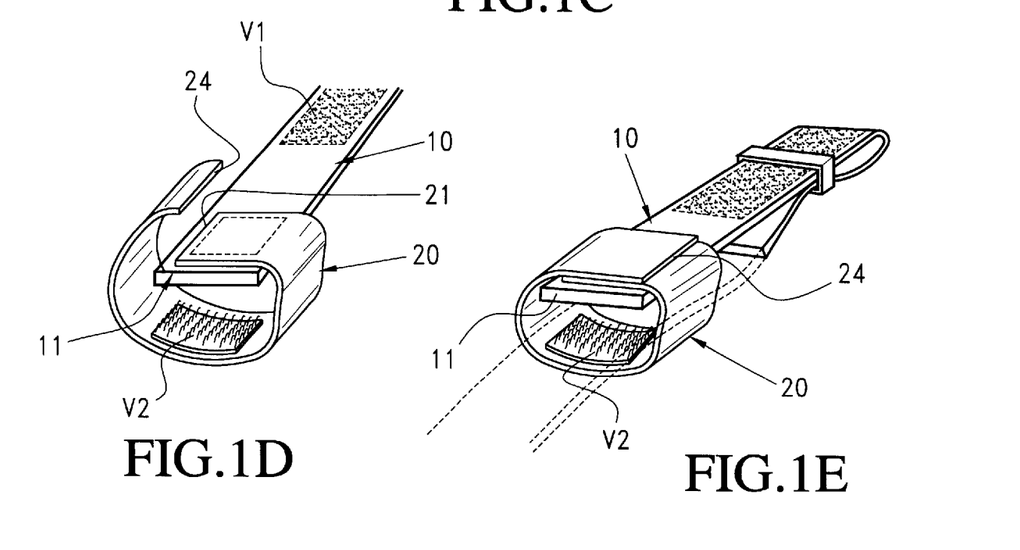
FIGS 1D and 1E are perspective views showing the securing of the short strap member to the elongated webbing of the adjustable strap assembly of the present invention.

The present invention relates to adjustable strap assembly which can be used on a variety of articles, including for example, animal collars, animal harnesses, backpacks, and the like. More specifically, the adjustable strap assembly 1 shown in FIGS. 1, 1A and 1B includes an elongated webbing 10 and a securing strap member 20, hereinafter sometimes referred to as strap member 20. The elongated webbing 10 comprises a first end 11, a first looped end 11a, a first securing means 12 having a first post member 12a attached to the first looped end 11a and a second post member 12b, a ring element 13, a mid-section 14, an outersurface 15, an undersurface 16 and a second end 17. The outersurface 15 of the elongated webbing 10 is provided with loop-type fastening means V1. The securing strap member 20 comprises a first strap end 21, an outersurface 22, an undersurface 23 and a second strap end 24, as shown in FIGS. 1C, 1D and 1E. The undersurface 23 of the strap member 20 is provided with hook-type fastening means V2. Both the elongate strap 10 and strap member 20 can be composed of any type of flexible webbing material. Suitable such materials include, for example, cloth belted webbing, leather, nylon webbing, flexible plastic materials, vinyl webbing materials, elastic webbing straps and rope style webbing. Such materials also can be provided with particular features, including for example, reflective, glow-in-the-dark and/or printed design features, for example animal prints, and may be of any suitable length, width, thickness and strength.

First looped end 11a is formed by passing the first end 11 through the ring element 13 in a first direction, looping the first end 11 about the post member 12a, then passing the first end back through the ring element in a second direction which is opposite that of the first direction, such that the undersurface of first end 11 lies along the undersurface of the mid-section 14. The first end 11 is releasably attached to the mid-section 14 by means of the securing strap member 20. More specifically, the strap member 20 is looped about both the first end 11 and the midsection 20 and secured to the outersurface of first end 11. The strap member 20 can be secured to the first end 11 by first attaching the first strap end 21 to the first end 11 and then attaching the second strap end 24 to the first strap end 21, or both the first and second strap ends can be secured to the first end 11. Suitable means for securing the strap member 20 to the first end 11 include, for example, stitching, adhesive or heat bonding.

As the strap member 20 is secured to the first end 11 of the elongated webbing 10, the hook-type fastening means V2 provided on the undersurface 23 of the securing strap member 20 contacts the loop-type fastening means V1 provided on the outersurface 15 of the elongated webbing 10, thereby releasably attaching the elongated webbing 10 with the securing strap member 20 when the hook-type and loop-type fastening means are brought together. Release of the hook-type fastening means from the loop-type fastening means allows the first end 11 of the elongated webbing 10 to be guided over the mid-section of the elongated webbing to a desired position and then re-engaging the hook-type and loop-type fastening means, thereby re-securing the first end at the desired position. In this manner, the distance between the first and second ends 11 and 17 can be adjusted, thereby providing a simple means to adjust the length of the elongated webbing 10.

Figure 1F:
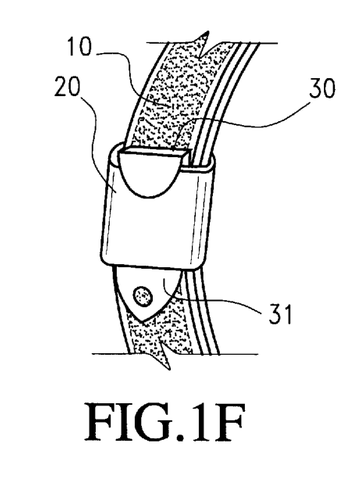
FIG. 1F is a side perspective view of the key of the adjustable strap assembly of the present invention.
Figure 1G:
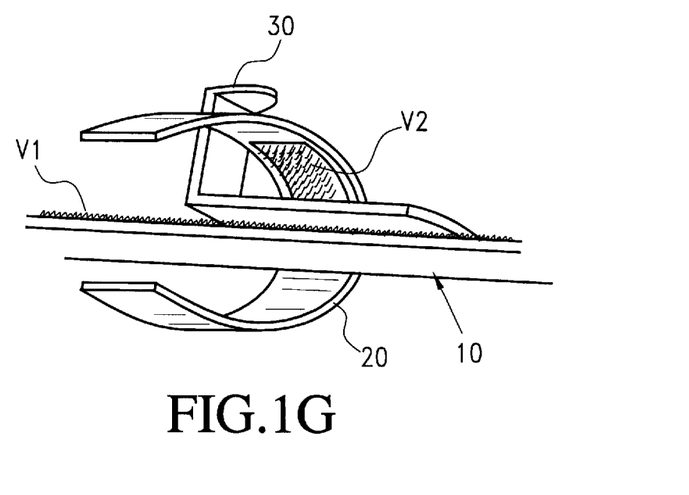
FIG. 1G is a perspective view showing the use of the key with the adjustable strap assembly of the present invention.

The adjustable strap assembly of the present invention preferably comprises a key 30 having a leg member 31 which is configured to slide between the hook-type fastening means V2 and the loop type fastening means V1, thereby facilitating the disengagement of the hook-type fastening means from the loop type fastening means, as shown in FIG. 1F and FIG. 1G. Once the length of the elongated webbing has been adjusted, the key is removed and the hook-type and loop-type fastening means are brought together to re-secure the elongated webbing to the securing strap member. The key can be composed of a variety of materials, including for example, plastics, metals, fiberglass and wood materials.

Figure 2:
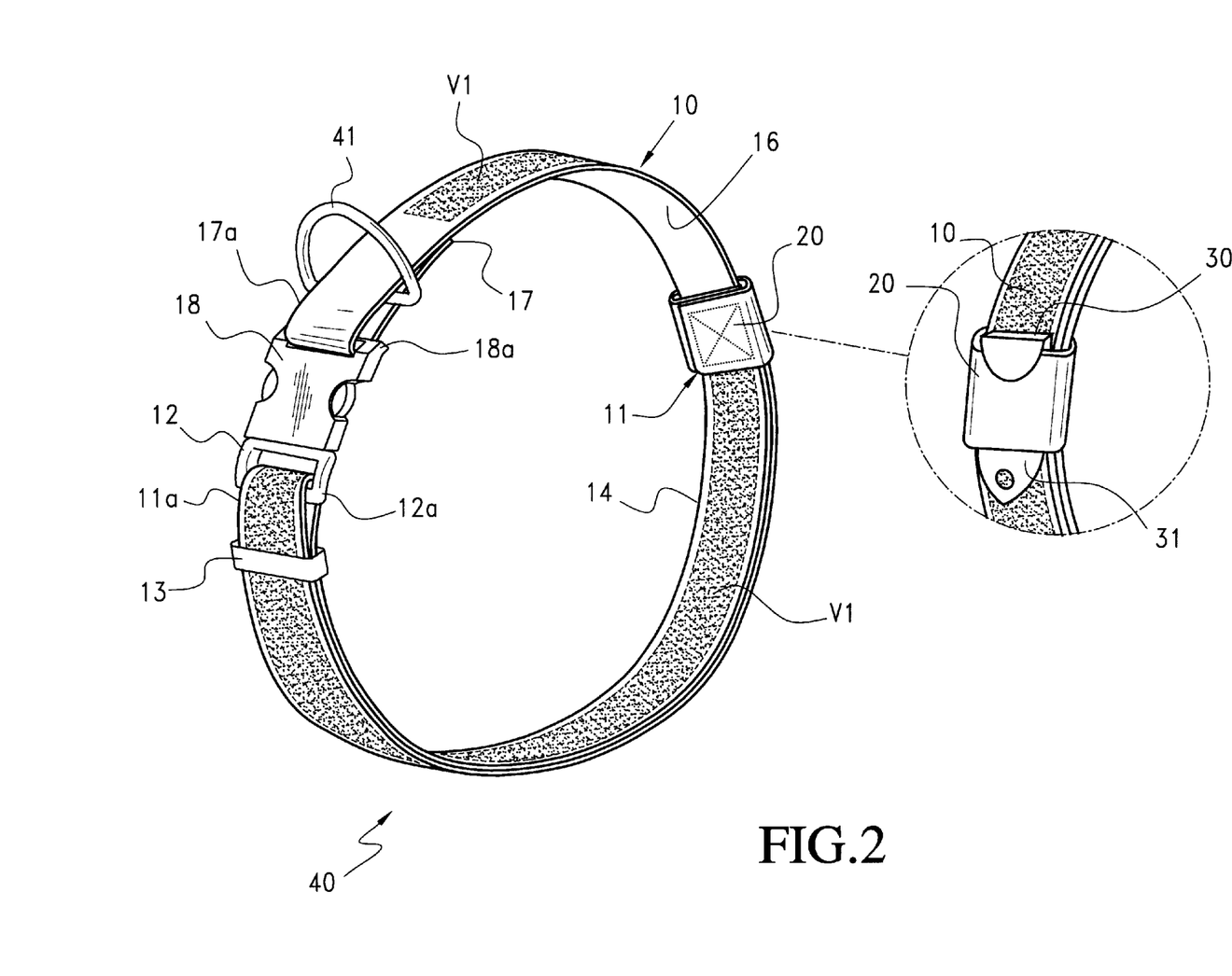
FIG. 2 is a side perspective view of the adjustable strap assembly of the present invention adapted for use as a collar.

The adjustable strap assembly of the present invention is versatile in the way it can be used and incorporated into a variety of articles requiring adjustment. For example, a simple modification of the adjustable strap assembly of the present invention transforms the adjustable strap assembly into a collar, such as an animal collar, such as is shown in FIG. 2. Referring to FIG. 2, collar 40 is constructed when the adjustable strap assembly 1 is modified by providing a second looped end 17a and a second securing means 18 having a post member 18a attached to the second looped end 17a. The second looped end 17a is formed by looping the second end 17 about the post member 18a of the second securing means 18 and securing the second end 17 to said undersurface 16 of the elongated webbing 10. The second securing means 18 attached to the second looped end 17a is configured in such a manner that it is detachably securable to said first securing means 12 attached to said first looped end 11a, thereby joining the first and second looped ends. Preferably, the second end 17 is looped about a D-ring 41 prior to being looped about the post member 18a in the construction of second looped end 17a. Adjustability of the collar 40 is achieved by the release of the hook-type fastening means V2 from the loop-type fastening means V1 and sliding or guiding the elongated webbing 10 along the mid-section 14 to the desired adjusted position and then re-engaging the hook- and loop-type fastening means, thereby re-securing the first end at the desired adjusted position. The first and second securing means can be any type of complementary fastening elements, including for example, buckling members. Preferably, the first securing means 12 is a male buckling member and the second securing means 18 is a female buckling member.

Figure 3:
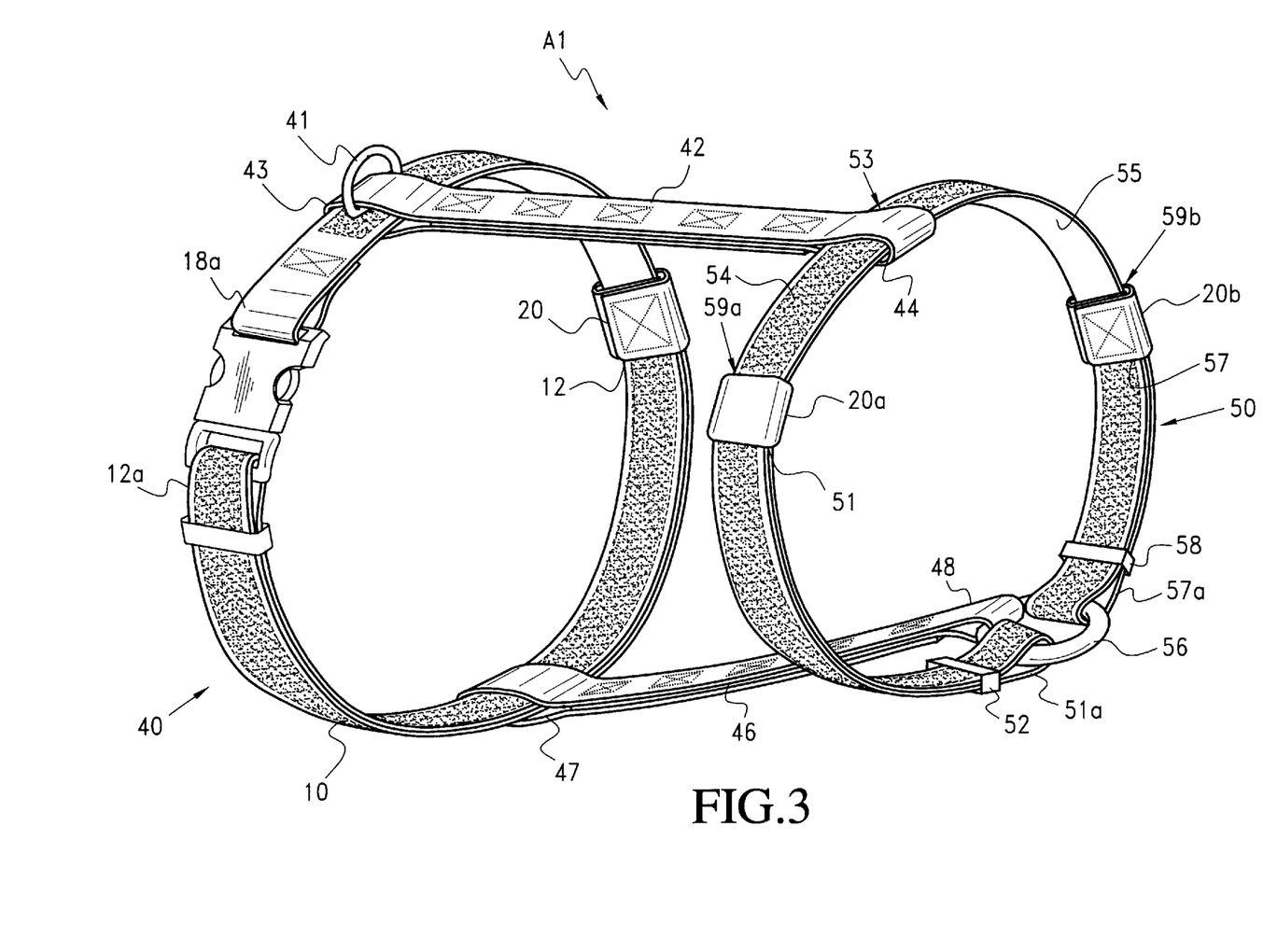
FIG. 3 is a side perspective view of the adjustable strap assembly of the present invention adapted for use as a collar and harness assembly.

The adjustable strap assembly of the present invention can be adapted for use as a collar and harness assembly. Referring to FIG. 3, a collar and harness assembly A1 is shown comprising collar assembly 40, an upper looped belt member 42, a lower looped belt member 46, and a chest collar 50. Chest collar 50 is a modification of the adjustable strap assembly of the present invention. More particularly, chest collar 50 comprises a first end 51, a first looped end 51a, a first rectangular ring 52, and a mid-section 53, and outersurface 54, and undersurface 55, an O-ring 56, a second end 57, a second looped end 57a, a second rectangular ring 58, and first and second securing sites 59a and 59b. The outersurface 54 of the chest collar 50 is provided with loop-type fastening means V1. Chest collar 50 can be composed of any type of flexible webbing material. Suitable such materials include, for example, cloth belted webbing, leather, nylon webbing, flexible plastic materials, vinyl webbing materials, elastic webbing straps and rope style webbing. Such materials also can be provided with particular features, including for example, reflective, glow-in-the-dark and/or printed design features, for example animal prints, and may be of any suitable length, width, thickness and strength.

First looped end 51a is formed by passing the first end 51 through first rectangular ring 52 in a first direction, looping the first end 51 through the O-ring 56, then passing the first end back through the rectangular ring 52 in a second direction which is opposite that of the first direction, such that the undersurface of first end 11 lies along the undersurface of the first securing site 59a. The first end 51 is releasably attached to the first securing site 59a by means of a securing strap member 20a. Similarly, second looped end 57a is formed by passing the second end 57 through second rectangular ring 58 in a first direction, looping the second end 57 through the O-ring 56, then passing the second end back through the rectangular ring 58 in a second direction which is opposite that of the first direction, such that the undersurface of first end 11 lies along the undersurface of the second securing site 59b. The second end 57 is releasably attached to the second securing site 59b by means of a securing strap member 20b.

Securing strap members 20a and 20b are identical to securing strap member 20 and function in the same manner as securing strap member 20. In this configuration, adjustability of the chest collar 50 is achieved by the release of the hook-type fastening means V2 provided on the undersurface of each of the strap members 20a and 20b from the loop-type fastening means V1 provided on the outersurface 54 of the chest collar, and sliding or guiding the first end 51 and/or the second end 57 toward or away from mid-section 53 to the desired adjusted positions and then re-engaging the hook-type and loop-type fastening means, thereby re-securing the first end 51 and/or the second end 57 at the desired adjusted positions.

The collar assembly 40 and chest collar 50 are joined by upper and lower looped belt members 42 and 46. Again referring to FIG. 3, upper looped belt member 42 comprises a first looped end 43 which is formed about D-ring 41 and the elongated web 10 of collar assembly 40 near first looped end 18a of the collar assembly, and a second looped end 44 which is formed about the mid-section 53 of chest collar 50. The lower looped member 46 comprises a first looped end 47 which is formed about the elongated web 10 of collar assembly 40 between the second end 12 and second looped end 12a, and a second looped end 48 which is looped through O-ring 56. The upper and lower looped belt members can be composed of any type of flexible webbing material. Suitable such materials include, for example, cloth belted webbing, leather, nylon webbing, flexible plastic materials, vinyl webbing materials, elastic webbing straps and rope style webbing. Such materials also can be provided with particular features, including for example, reflective, glow-in-the-dark and/or printed design features, for example animal prints, and may be of any suitable length, width, thickness and strength.

Figures 4, 4A:
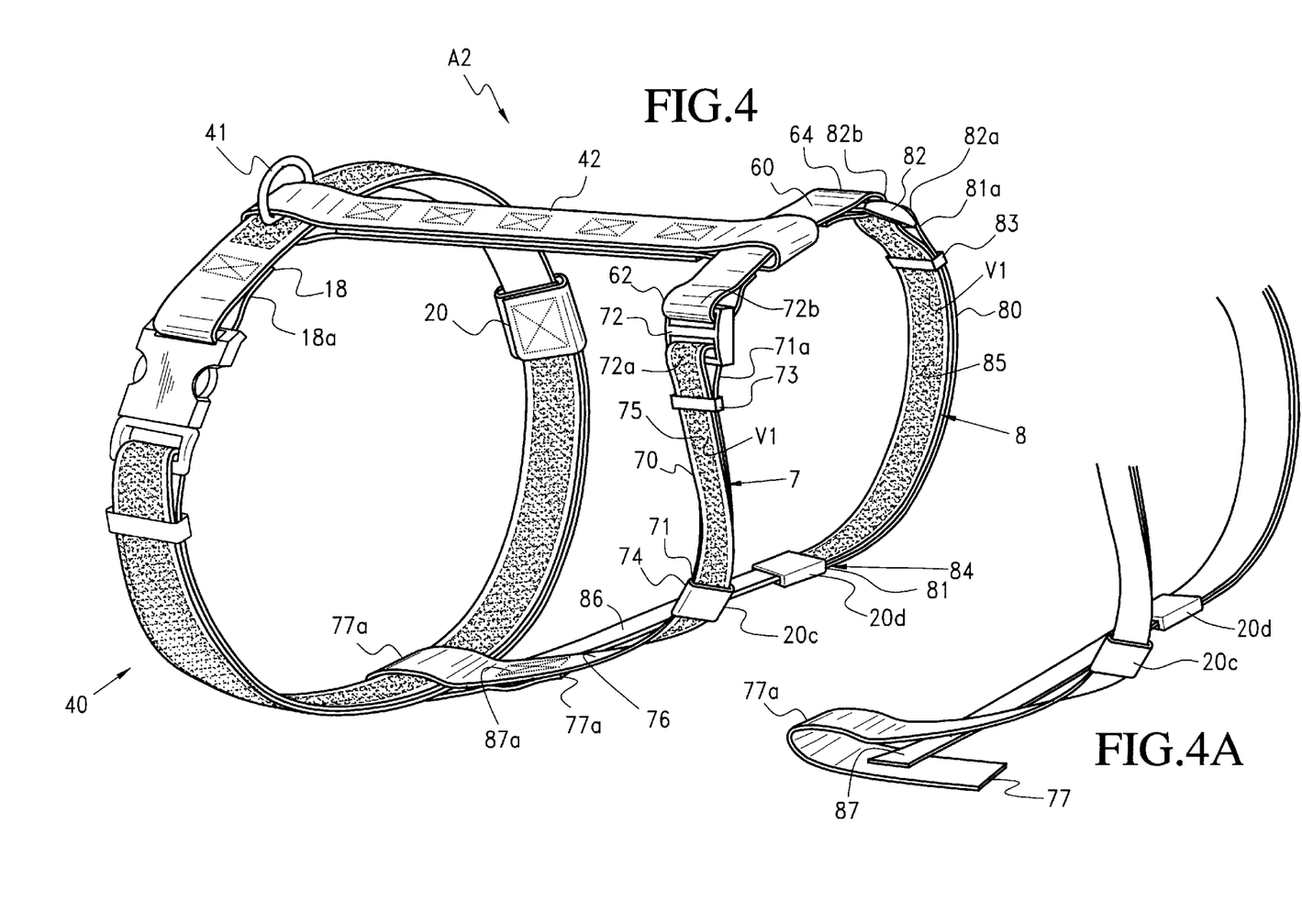
FIG. 4 is a side perspective view of the adjustable strap assembly of the present invention adapted for use as a collar and harness assembly.
FIG. 4A is a side perspective view showing a securing means for the collar and harness assembly of FIG. 4.

Another adaption of the adjustable strap assembly of the present invention for use as a collar and harness assembly is shown in FIG. 4. Referring to FIG. 4, a collar and harness assembly A2 is shown comprising the collar 40, an upper looped belt member 42, a cross looped belt member 60, a first adjustable strap assembly 7 comprising an elongated web 70 and a securing strap member 20C and second adjustable strap assembly 8 comprising an elongated web 80 and a securing strap member 20D. First and second adjustable strap assemblies 7 and 8 are constructed in the same manner as the adjustable strap assembly 1 shown in FIG. 1. More particularly, adjustable strap assembly 7 comprises an elongated webbing 70 comprises a first end 71, a first looped end 71a, a first securing means 72 having first and second post members 72a and 72b attached to the first looped end 71a, a ring element 73, a mid-section 74, an outersurface 75, an undersurface 76 and a second end 77. The outersurface 75 of the elongated webbing 70 is provided with loop-type fastening means V1.

Similarly, the adjustable strap assembly 8 comprises an elongated webbing 80 comprises a first end 81, a first looped end 81a, a first securing means 82 having first and second post members 82a and 82b attached to the first looped end 81a, a ring element 83, a mid-section 84, an outersurface 85, an undersurface 86 and a second end 87. The outersurface 85 of the elongated webbing 80 is provided with loop-type fastening means V1. Each of the first looped ends 71a and 81a are formed in the same manner as first looped end 11a, each being looped about first post member 72a and 82a of the respective securing means 72 and 82. The second end 77 is looped about the elongated web 10 of collar assembly 40 and secured to its underside, such as by stitching, adhesive or heat bonding, to form a second looped end 77a. The second end 87 is inserted between the undersurfaces 87 of the looped end 77a and secured therebetween, such as by stitching, adhesive or heat bonding, thereby connecting the two adjustable strap assemblies 7 and 8 to the collar assembly 40, as shown in FIG. 4A.

The cross looped belt member 60 comprises a first looped end 62 which is formed about second post member 72b of first securing means 72 and a second looped end 64 which is formed about second post member 82b of second securing means 82. Thus, the first and second adjustable strap assemblies 7 and 8 are connected to one another through the cross looped belt member 60 by means of the respective securing means 72 and 82. The cross looped belt member can be composed of any type of flexible webbing material. Suitable such materials include, for example, cloth belted webbing, leather, nylon webbing, flexible plastic materials, vinyl webbing materials, elastic webbing straps and rope style webbing.

The upper looped belt member 42 is connected to the collar assembly in the same manner as described above in reference to the collar and harness assembly A1. The upper looped belt member joins the collar assembly 40 to the looped belt member 60 through second looped end 44 which is formed about the looped belt member 60.

Other animal control assemblies and harness assemblies can be constructed with simple modification of the adjustable strap assembly of the present invention. Such types of animal control and harness assemblies include for example, animal leashes, children harnesses, safety harnesses, parachute harnesses, horse bridles, horse and saddle belly straps and horse reign straps.

The adjustable strap assembly also can be incorporated into a wide variety of articles requiring some adjustment by the user. Such articles include for example, cloth bags such as gym bags, tote bags, duffel bags and military bags, back packs, clothing articles such as overalls, suspenders, bras, waist belts, watch bands, head bands, baseball caps, industrial and domestic apron straps, safety helmets, head-light bands for hunters, luggage straps and shoulder straps for purses.

Figure 5:
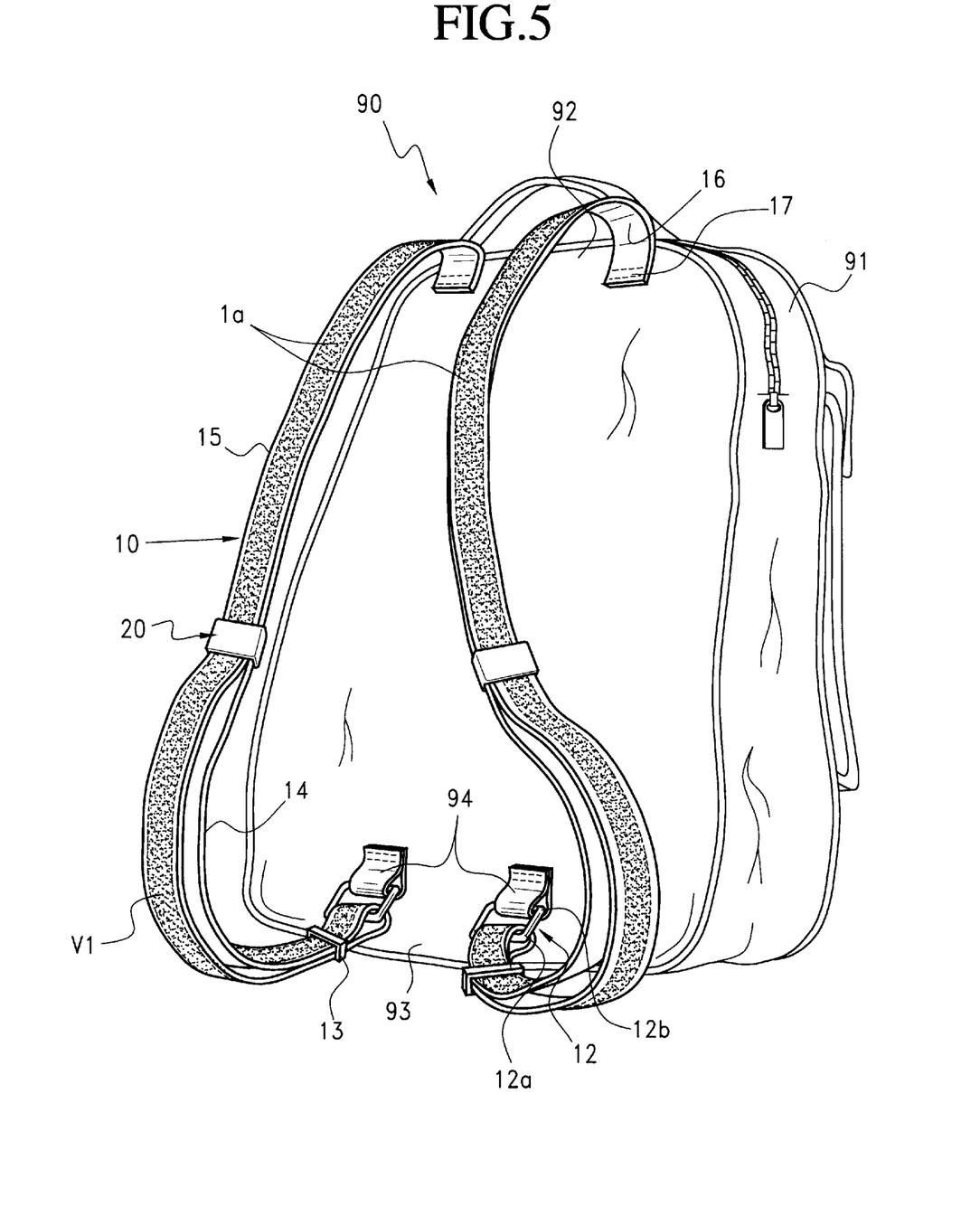
FIG. 5 is a side perspective view of the adjustable strap assembly of the present invention used as a strap member for a back pack.

FIG. 5 shows the adjustable strap assembly of the present invention used as an adjustment means for a conventional back pack 90. Referring to FIG. 5, a back pack 90 comprises a bag portion 91 having an upper end 92, a lower end 93, two securing loops 94 attached to the lower end 93, and two shoulder strap assemblies 1a. Each shoulder strap assembly 1a is constructed in the same manner as described in reference to the adjustable strap assembly 1 shown in FIG. 1, each comprising an elongated webbing 10 and a securing strap member 20. More specifically, the elongated webbing 10 comprises a first end 11, a first looped end 11a, a first securing means 12 having a first post member 12a attached to the first looped end 11a and a second post member 12b, a ring element 13, a mid section 14, an outersurface 15, an undersurface 16 and a second end 17, the outersurface 15 being provided with loop-type fastening means V1. The securing strap member 20 comprises a first strap end 21, an outersurface 22, an undersurface 23 and a second strap end 24, the undersurface 23 being provided with hook-type fastening means V2, as shown in FIG. 1A. Each of the shoulder strap assemblies 1a is secured to the back pack 90 in the same manner. The second end 17 of the shoulder strap assembly 1a is attached to the upper end 92 of bag portion 91 by suitable means, including for example, stitching, adhesive or heat bonding. Each securing loop 94 comprises a first end 94a and a second end 94b. First end 94a of securing loop 94 is looped about post member 12b and secured to second end 94b and to the lower end 93 of bag portion 91, by suitable means, including for example, stitching, adhesive or heat bonding, thereby forming a securing loop. In this manner, the first looped end 11a of each shoulder strap assembly 1a is attached to a corresponding securing loop 94 at the lower end 93 of bag portion 91. In order for the user to obtain a comfortable fit of the back pack over the shoulders, each adjustable strap assembly 1a is adjusted by releasing the hook-type fastening means provided on the securing strap member 20 from the loop-type fastening means provided on the elongated web 10.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. An adjustable strap assembly comprising:
    an elongated webbing having a first end, a first looped end, a second end, a mid-section, an outersurface provided with loop-type fastening means, an undersurface, a first securing means attached to said first looped end, said first securing means having a post member and a ring element, said first looped end being formed by passing said first end through said ring element, looping said first end about said post member, then passing said first end back through said ring element to said mid-section such that said undersurface of said first end contacts said undersurface of said mid-section; and
    a strap member having a first strap end, a second strap end, an outersurface and an undersurface provided with hook-type fastening means, said strap member being looped about said first end and said mid-section of said elongated webbing and securing said first and second strap ends to said first end of said elongated webbing in such a manner that said hook-type fastening means of said strap member releasably engages said loop-type fastening means of said midsection,
    wherein, the release of said hook-type fastening means from said loop-type fastening means allows said first end of said elongated webbing to be guided over said mid-section, thereby enabling the distance between said first and second ends of said elongated webbing to be adjusted.

2. The adjustable strap assembly in accordance with claim 1, further comprising a key having a leg member which is configured to slide between said hook-type fastening means and said loop-type fastening means, thereby facilitating the release of said hook-type fastening means from said loop-type fastening means.

3. The adjustable strap assembly in accordance with claim 1, further comprising a second looped end and a second securing means attached to said second looped end, said second securing means having a second post member, said second looped end being formed by looping said second end about said second post member and securing said second end to said undersurface of said elongated webbing, wherein said second securing means is configured in such a manner that it is detachably securable to said first securing means attached to said first looped end.

4. The adjustable strap assembly in accordance with claim 3, wherein said adjustable strap assembly is in the form of an animal collar.

5. The adjustable strap assembly in accordance with claim 4, further comprising a D-ring, said second looped end being formed by first introducing said second end through said D-ring and then looping said second end about said second post member and securing said second end to said undersurface of said elongated webbing.

6. The adjustable strap assembly in accordance with claim 4, further comprising a chest collar, an upper looped belt member and a lower looped belt member, said upper looped belt member and said lower looped belt member each joining said animal collar to said chest collar, thereby forming a collar and harness assembly.

7. The adjustable strap assembly in accordance with claim 6, wherein said chest collar comprises a first end, a first looped end, a first rectangular ring, a mid-section, an outersurface provided with loop-type fastening means, an undersurface, an O-ring, a second end, a second looped end, a second rectangular ring and first and second securing sites and two securing strap members.

8. The adjustable strap assembly in accordance with claim 4, further comprising second and third additional adjustable strap assemblies, a cross looped belt member and an. upper looped belt member, wherein said second and third adjustable strap assemblies are joined to one another through said cross looped belt member by their respective first securing means, said animal collar is joined to said cross looped belt member by said upper looped belt member, thereby forming a collar and harness assembly.

9. An adjustable article comprising an upper end, a lower end, first and second securing loops attached to said lower end, and first and second adjustable strap assemblies each in accordance with the adjustable strap assembly of claim 1, wherein said second end of each of said first and second adjustable strap assemblies are secured to said upper end of said adjustable article and said first securing means of said first adjustable strap assembly is attached to said first securing loop and said first securing means of said second strap assembly is attached to said second securing loop.

10. The adjustable article in accordance with claim 9, wherein said article is a back pack.

11. The adjustable strap assembly in accordance with claim 1, wherein said elongated webbing is a flexible material selected from the group consisting of cloth belted webbing, leather, nylon webbing, flexible plastic materials, vinyl webbing materials, elastic webbing straps and rope style webbing.

12. The adjustable strap assembly in accordance with claim 11 wherein said elongated flexible webbing is provided with reflective and/or glow-in-the-dark features.

13. The adjustable strap assembly in accordance with claim 11, wherein said elongated flexible webbing is provided with a printed design.

14. The adjustable strap assembly in accordance with claim 2, wherein said key is constructed from a material selected from the group consisting of plastics, metals, fiberglass and wood materials.

* * * * *